United States Patent [19]

Negus

[11] Patent Number: 4,497,601
[45] Date of Patent: Feb. 5, 1985

[54] CUTTING TOOL

[75] Inventor: Terence I. Negus, Camborne, England

[73] Assignee: Multi Bar Systems Ltd., Cornwall, England

[21] Appl. No.: 433,661

[22] Filed: Oct. 12, 1982

[51] Int. Cl.³ ............................................. B23B 29/02
[52] U.S. Cl. .................................... 408/156; 408/185; 408/714
[58] Field of Search ............... 408/181, 185, 153, 154, 408/155, 156, 157, 159, 180, 182, 183, 82, 83, 713, 714

[56] References Cited

U.S. PATENT DOCUMENTS

| | | | |
|---|---|---|---|
| 2,537,517 | 1/1951 | De Vlieg | 408/153 |
| 3,213,717 | 10/1965 | Breuning | 408/154 |
| 3,217,569 | 11/1965 | Sweeny | 408/153 |
| 3,349,648 | 10/1967 | Holloway | 408/154 |
| 3,434,376 | 3/1969 | Benjamin et al. | 408/153 |
| 3,877,832 | 4/1975 | Benjamin | 408/155 |

Primary Examiner—Z. R. Bilinsky
Attorney, Agent, or Firm—Holman & Stern

[57] ABSTRACT

A cutting tool has a body with an external screw threaded portion on which is mounted an internally screw threaded adjustment ring, a disc spring, a tapered collet having a frusto conical surface and a clamping member. The frusto conical surface is adapted to be engaged against a frusto conical recess in a tool holder having a bore therein in which said body is insertable. The body is adjustable axially of the tool holder by rotation of the ring and then clamped in position by the clamping member such as a bolt. A key engaged in a keyway prevents rotation of the body relative to the tool holder. The cutting tool is thus lockable relative to the tool holder firmly and accurately.

14 Claims, 2 Drawing Figures

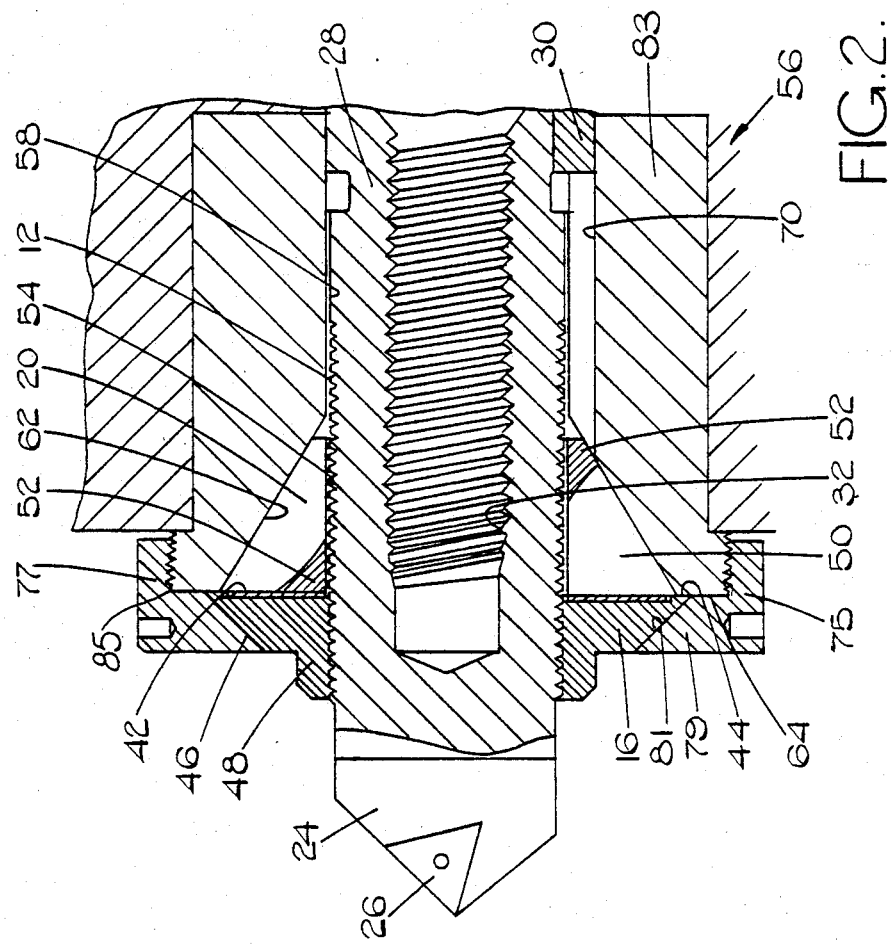

CUTTING TOOL

FIELD OF THE INVENTION

This invention relates to a cutting tool and is more particularly concerned with a type of cutting tool which can be adjustably mounted on the rotary tool holder (sometimes called the boring bar) of a machine tool.

BRIEF SUMMARY OF THE INVENTION

It is an object of the present invention to provide a cutting tool which is readily adjustable relative to the tool holder but which can be locked into position more firmly and accurately than existing adjustable cutting tools.

According to one aspect of the present invention, there is provided a cutting tool comprising (a) an externally screw-threaded body which is mounted, in use, in a bore in a tool holder so as to be axially slidable therein, said body having one end adapted to receive a cutting tip or the like; (b) a clamping member; (c) an internally screw-threaded element engaged with the screw threading on the body and having an abutment surface adapted to engage a corresponding first abutment surface on the tool holder; and (d) a tapered collet mounted on said body and adapted to engage against a tapered recess in the tool holder; the arrangement being such that, in use, the cutting tool can be adjusted in position relative to the tool holder by rotation of the internally screw-threaded element relative to the body and the cutting tool can be clamped in the desired position by the clamping member so that the abutment surface on the internally screw-threaded element is held against the first abutment surface on the tool holder and, at the same time, the tapered collet is compressed inwardly so as to clamp against the body of the cutting tool.

In a particularly preferred embodiment, the clamping member is screw-engaged with an appropriate end of the body to which the cutting tip or the like is secured in use, the clamping member having a head engageable against a corresponding surface in or on the toolholder. However, in designs where access to such a clamping member is difficult or impossible, the clamping member may be engaged with a part of the toolholder and engageable with the internally screw-threaded element.

Although the collet may be formed integrally with the internally screw-threaded element, or directly engaged therewith, it is highly preferred for a resilient member to be disposed between the collet and the internally screw-threaded element so that operation of the clamping member causes the internally screw-threaded element to apply axial pressure to the collet through the intermediary of the resilient element.

In a preferred construction, the body has a ground peripheral surface over a portion thereof which is at or adjacent said opposite end thereof. With such an arrangement, a precision fit can be obtained with a suitable reamed bore in the tool holder.

To prevent rotation of the body in the bore of the tool holder, it is preferred for the body to be provided with a key which is a sliding fit in a keyway in the bore of the tool holder, the key preferably having ground surfaces. For smaller sizes of tool, the key is preferably of round section, whereas for larger sizes of tool, the key is preferably of rectangular section.

Most advantageously, the abutment surface on the internally screw-threaded element is planar for engagement with a planar abutment surface on the tool holder.

According to another aspect of the present invention, there is provided a combination of cutting tool according to said one aspect of the present invention and a tool holder having (1) a bore therein in which the body of the cutting tool is received, (2) a tapered recess in which the collet is received, (3) an abutment surface for engagement with the abutment surface of the internally screw-threaded element, and (4) a portion for co-operation with the clamping member, so that operation of the clamping member holds the abutment surface of the internally screw-threaded member against the abutment surface of the tool holder.

BRIEF DESCRIPTION OF THE DRAWINGS

An embodiment of the present invention will now be described, by way of example, with reference to the accompanying drawings wherein;

FIG. 2 is an axial cross-sectional view of part of a modified cutting tool, also according to the present invention.

DETAILED DESCRIPTION

Figure 1:
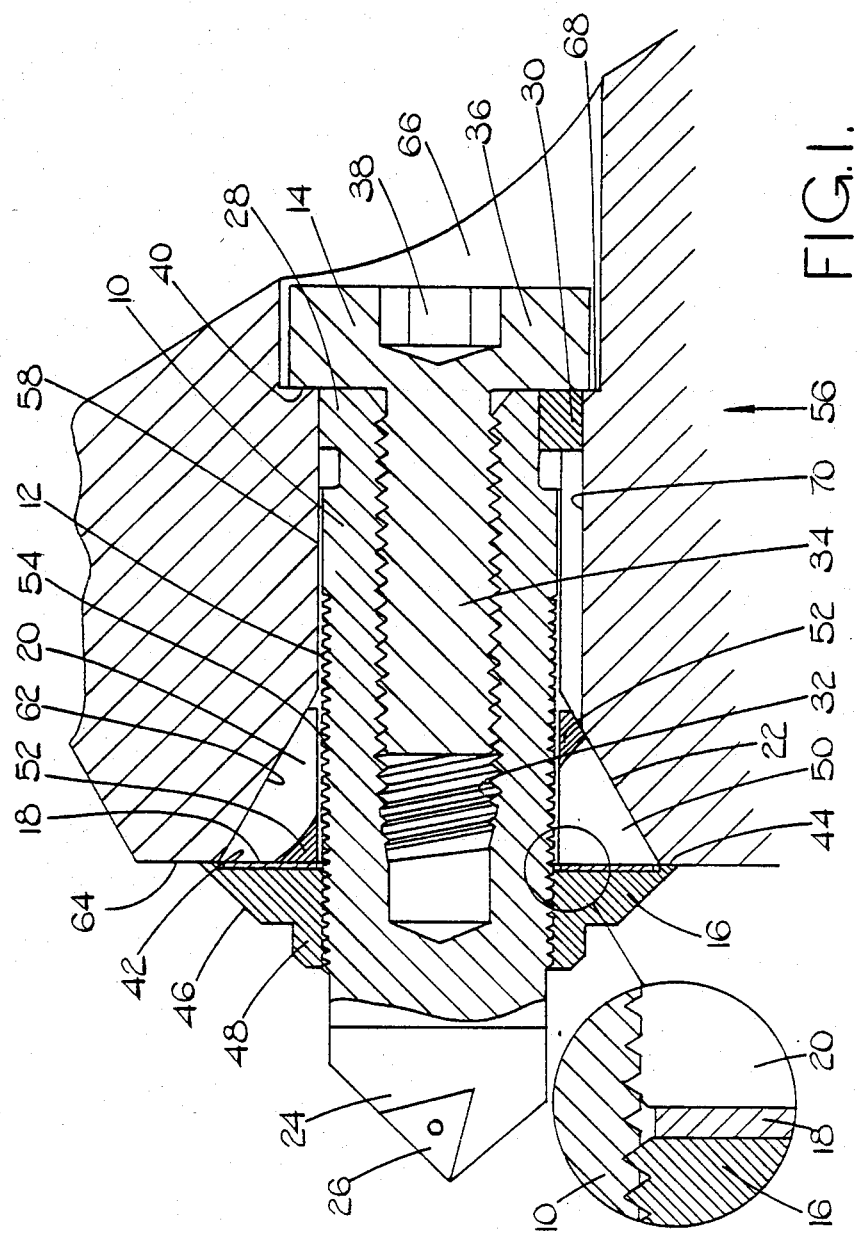
FIG. 1 is an axial cross-sectional view through one embodiment of cutting tool according to the present invention, with an inset figures showing an enlargement of part of the cutting tool.

Referring to FIG. 1 of the drawings, the cutting tool comprises a cylindrical body 10 of circular cross-section which is externally screw-threaded over a major portion 12 thereof intermediate its ends. The cutting tool further comprises a clamping bolt 14, an internally screw-threaded adjustment ring 16, a disc spring 18, and a collet 20 having a frusto-conical outer peripheral surface 22.

One end portion 24 of the body 10 has a replaceable cutting tip 26 brazed or clamped thereto. An opposite end portion 28 of the body 10 has an outer peripheral surface which is accurately ground and has a radially projecting key 30 which in this embodiment is brazed in position and which has been previously ground so as to be accurately of the required size and shape. For smaller sizes of tool, the key 30 is of round section but for larger size of tool, it is of rectangular section. The body 10 is provided with an axially extending internally screw-threaded bore 32 which opens onto the opposite end of the body 10. The internally screw-threaded bore 32 receives an externally screw-threaded shank 34 of the clamping bolt 14. A head 36 of the clamping bolt 14 has a hexagonal recess 38 therein to enable rotation of the bolt 14 by a suitable wrench. On the head 36 is defined a planar annular abutment surface 40 which is disposed radially outwardly of the opposite end portion 28 of the body 10.

The adjustment ring 16 has a shallow recess 42 therein which has a depth equal to the thickness of the material from which the disc spring 18 is formed. The ring 16 has a planar, annular abutment surface 44 which is disposed radially outwardly of the recess 42 and extends perpendicularly to the axis of the ring 16. In addition, the ring 16 is provided with a frusto-conical peripheral surface portion 46 having a graduated scale (not shown) therearound, and also a portion 48 of square or hexagonal cross-section for engagement by a suitable tool such as a spanner.

The disc spring 18 is of circular, frusto-conical form when in its axially uncompressed state. In the drawing, the disc spring 18 is shown in a fully axially compressed state.

The collet 20 is resiliently compressible in the radial direction by virtue of the provision of axially extending slots 50 therein which extend completely through the collet 20 except for portions 52 serving to connect integrally together those portions of the collet 20 which are separated by the slots 50. The portions 52 are disposed alternately at opposite axial ends of the collet 20. The frusto-conical peripheral surface 22 of the collet 20 has a cone angle of 60 degrees although it is within the scope of the present invention for it to have any desired cone angle (e.g. 90 degrees, ie. to subtend an angle of 45 degrees with respect to the longitudinal axis of the collet 20.) The internal surface 54 of the collet 20 is accurately machined so as to have a cylindrical surface of circular cross-section which is a close sliding fit on the outer peripheral surface of the body 10 when the collet is in a radially uncompressed state. The crests of the screw-threading on the outer peripheral surface of the body 10 are flat so as to minimise damage thereto when the collet 20 is radially compressed as will be described hereinafter.

The above described cutting tool is designed to be mounted in a rotary tool holder or boring bar whose outer end portion is shown generally by arrow 56. The tool holder has an inner end or shank (not shown) which is adapted to be mounted in the standard rotary chuck of a machine tool (not shown). The end portion 56 of the tool holder has an accurately reamed transverse bore 58 which, at one end, opens centrally into the top of an inwardly tapering frusto-conical recess 62 having a cone angle, in this embodiment, of 60 degrees. The recess 63 is surrounded, on an outer surface of the end portion 56 by a first planar annular abutment surface 64 which extends at right angles to the axis of the bore 58. The abutment surface 64 is provided with one or more datum marks thereon (not shown) for use in conjunction with the graduated scale on the frusto-conical peripheral portion 46 of the adjustment ring 16. The opposite end of the bore 58 opens into an enlarged bore 66 so that a second planar abutment surface 68 is defined within the end portion 56. The second planar abutment surface 68 is of annular form and is disposed at right angles to the axis of the bore 58.

An accurately machined keyway 70 opens into the bore 58 and is co-extensive with the latter.

To mount the cutting tool in the tool holder, the clamping bolt 14 removed, the body 10 of the cutting tool is inserted into the bore 58 through the frusto-conical recess 62 until the abutment surface 44 on the adjusting ring 16 engages against the first abutment surface 64 of the tool holder. The clamping bolt 14 is then inserted into the bore 32 in the body 10 by passing it through the enlarged recess 66. The axial position of the tool bit 26 relative to the tool holder can be accurately adjusted by appropriate rotation of the adjusting ring 16, the graduated scale thereon in conjunction with the datum mark or marks on the abutment surface 64 providing an indication of the adjusted position. When the tool bit 26 is in the desired position, the clamping bolt 14 is tightened using a suitable wrench in the socket 38 so that the abutment surface 40 on the head 36 is brought into engagement with the second abutment surface 68 in the tool holder and the abutment surface 44 of the adjusting ring 16 is brought into firm engagement with the first abutment surface 64. During this movement, an axial force is applied to the disc spring 18 and this force is transmitted via the spring 18 to the collet 20. As a result, the collet 20 is radially compressed in a resilient manner as permitted by the slots 50 so that the inner peripheral surface 54 of the collet 20 is firmly clamped around the screw-threaded portion of the body 10. Axial movement of the body 10 relative to the tool holder is prevented because of mutual engagement of the abutment surfaces 44, 64 and 40, 68, respectively. Rotation of the body 10 is prevented because of engagement of the key 30 in the keyway 70, the key 30 being an accurate sliding fit within the keyway 70. The clamping of the collet 20 against the body 10 and the accurate fit between the outer periphery of the end portion 28 and the bore 58 of the tool holder prevents any rocking movement of the body 10 relative to the tool holder. Thus, the cutting tool is very firmly held against movement relative to the tool holder. When re-adjustment of the position of the cutting tip 26 relative to the tool holder is required, it is merely necessary to slacken off the clamping bolt 14 and then rotate the adjusting ring 16 in the required direction using a spanner or the like on the square or hexagonal portion 48. At this stage, the axial pressure exerted on the collet 20 by the disc spring 18 has been released so that the collet 20 is free to expand radially because of its inherent resilience. Thus, the body 10 is freed so that it can be moved relative to the collet 20. After the body 10 is the desired position, the clamping bolt 14 is retightened so as to secure the cutting tool in its new position.

The modified cutting tool shown in FIG. 2 is intended to be used in designs where access to the clamping bolt 14 is difficult or impossible. In this case, the clamping bolt 14 is dispensed with and a clamping member 75 is provided. The clamping member 75 takes the form of a collar having an internally screw-threaded outer portion 77 and an inner portion 79 having an internal frusto-conical surface 81. The end portion 56 of the tool holder includes a press fitted bushing 83 having an end portion 85 of larger diameter. The end portion 85 is externally screw-threaded and is engaged with the outer portion 77 of the member 75.

The cutting tool can be clamped relative to the tool holder by rotation of the clamping member 75 relative to the bushing 83 in one direction. Such rotation causes the internal frusto-conical surface 81 of the inner portion 77 of the member 75 to engage against the frusto-conical peripheral portion 46 of the adjustment ring 16 so as to hold the abutment surface 44 of the latter against the abutment surface 64 which, in this embodiment, is provided on the end of the bushing 83. The accurate fit between the machined surface of the key 30 and keyway 70 in the bushing 83 ensures that unwanted relative movement between the inner end of the body 10 and the bushing 83 is minimized. It is to be appreciated that a suitable window (not shown) is provided in the member 75 to enable the graduated scale on the ring 16 and the datum marks(s) to be viewed so that the ring 16 can be adjusted after the clamping member 75 is released.

In the above-described embodiments, the key 30 is brazed in position. However, in an alternative embodiment the key 30 is secured in position by means of a screw or other removable means.

It is within the scope of the present invention to provide a cutting tool in which the head or end portion 24 is larger than the diameter of the shank of the body 10.

Such an arrangement requires the adjustment ring 16, the disc spring 18 and the collet 20 to be assembled onto the body 10 over said opposite end portion 28 thereof, the key 30 in such a case being fitted (eg. by means of a screw) after assembly of the body 10 with ring 16, spring 18 and collet 20 thereon into the holder 56 or the bushing 83 as the case may be. It will be appreciated that, in such an arrangement, the screw threading on the body 10 will extend completely to the opposite end thereof to the head to enable the adjustment ring 16 to be assembled.

What I claim is:

1. A cutting tool removably mountable for use on a tool holder of a machine tool wherein the tool holder has a bore, a tapered recess extending inwardly from one end of the bore and a first abutment surface at the outer end of said tapered recess, the cutting tool comprising:

an adjustable body member adapted to be axially slidable in the bore of the tool holder having an outer end adjacent the tapered recess end of the bore;

a cutting tip on said outer end of said body member;

an external screw-thread on said body member;

an adjusting member having an internal screw-thread cooperatively engaging said external screw thread on said body member adjacent said outer end thereof;

an abutment surface on said adjusting member adapted to be engageable with the first abutment surface on the tool holder;

a tapered collet supported on said body member between said adjusting member and the tool holder having a tapered surface adapted to be cooperatively engageable with the tapered recess in the tool holder; and a releasable clamping member cooperatively engaging said body member and adapted to be operatively engageable with the tool holder;

so that when said clamping member is in a released position said cutting tip may be displaced with respect to the tool holder by rotation of said adjusting member, and when said clamping member is in a clamping position for use said abutment surface on said adjusting member is held tightly against the first abutment surface of the tool holder and said tapered collet is compressed inwardly by the tapered recess in said tool holder into clamping engagement with said adjustable body member to rigidly fix said cutting tip with respect to the tool holder.

2. The cutting tool as claimed in claim 1 wherein the tool holder has a second abutment surface at the end of the bore opposite the tapered recess and said clamping member comprises:

an internal threaded bore in the end of said body member opposite said outer end;

a clamping screw threadedly engaged in said internal threaded bore; and a head on said screw adapted to be engageable with said second abutment surface.

3. The cutting tool as claimed in claim 1 wherein said clamping member comprises:

a collar having means thereon adapted to be releasably engageable with the tool holder;

a clamping surface on said adjusting member; and a clamping surface on said collar slidingly engaging said clamping surface on said adjusting member;

said clamping surfaces being disposed with respect to each other, the tool holder and said collet so that when said collar is tightly engaged with the tool holder in the clamping position, said adjusting member is pressed toward the tool holder to compress said collet.

4. The cutting tool as claimed in claim 3 wherein the tool holder has an internal threaded portion adjacent the first abutment surface and wherein:

said means on said collar adapted to be releasably engageable with the tool holder comprises an internal threaded portion cooperatively engageable with the external threaded portion on the tool holder; and at least a part of said adjusting member is disposed between said clamping surface on said collar and the tool holder.

5. The cutting tool as claimed in claim 4 wherein said clamping surfaces comprise mating frusto-conical surfaces.

6. The cutting tool as claimed in claim 1 and further comprising:

said collet is a separate and independent part; and a resilient member is disposed between said collet and said adjusting member so that tightening said clamping member causes said adjusting member to apply axial pressure to said collet through said resilient member.

7. The cutting tool as claimed in claim 1 wherein said collet is slidingly mounted on said adjustable body member.

8. The cutting tool as claimed in claim 7 wherein said tapered recess and tapered surface are mating frusto-conical slidingly engageable surfaces.

9. The cutting tool as claimed in claim 6 wherein said collet is slidingly mounted on said adjustable body member.

10. The cutting tool as claimed in claim 9 wherein said tapered recess and tapered surface are mating frusto-conical slidingly engageable surfaces.

11. The cutting tool as claimed in claim 1 and further comprising:

a ground peripheral surface on said adjustable body member adjacent the end opposite to said cutting tip.

12. The cutting tool as claimed in claim 1 wherein an axially extending keyway is provided in the surface of the bore in the tool holder and further comprising:

a key on the outer surface of said adjustable body member, having ground surfaces thereon operatively engageable in sliding relationship in said keyway to prevent relative rotation between said adjustable body member and the tool holder.

13. The cutting tool as claimed in claim 1 wherein the first abutment surface is a planar surface and said abutment surface on said adjusting member comprises a planar surface engageable with the planar surface on the tool holder.

14. The cutting tool as claimed in claim 12, wherein said key is detachably secured to said body member.

* * * * *